(12) United States Patent
Jeol et al.

(10) Patent No.: US 11,685,829 B2
(45) Date of Patent: Jun. 27, 2023

(54) PROCESS FOR PREPARING PARTICLES OF AROMATIC POLYMERS, PARTICLES OBTAINABLE BY SAID PROCESS AND THEIR USES

(71) Applicant: SOLVAY SPECIALTY POLYMERS USA, LLC, Alpharetta, GA (US)

(72) Inventors: Stéphane Jeol, Cumming, GA (US); Kelly D. Branham, Woodstock, GA (US); David Blake Roller, Dunwoody, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 682 days.

(21) Appl. No.: 16/619,412

(22) PCT Filed: May 14, 2018

(86) PCT No.: PCT/EP2018/062424
§ 371 (c)(1),
(2) Date: Dec. 4, 2019

(87) PCT Pub. No.: WO2018/224246
PCT Pub. Date: Dec. 13, 2018

(65) Prior Publication Data
US 2020/0148880 A1 May 14, 2020

Related U.S. Application Data

(60) Provisional application No. 62/516,404, filed on Jun. 7, 2017.

(30) Foreign Application Priority Data

Aug. 1, 2017 (EP) .................... 17184269

(51) Int. Cl.
| | |
|---|---|
| *C08L 67/03* | (2006.01) |
| *B29B 9/12* | (2006.01) |
| *C08G 65/34* | (2006.01) |
| *C08L 61/18* | (2006.01) |
| *C08L 71/00* | (2006.01) |
| *C08L 79/08* | (2006.01) |
| *C08L 81/06* | (2006.01) |
| *B29K 67/00* | (2006.01) |
| *B29K 71/00* | (2006.01) |
| *B29K 81/00* | (2006.01) |

(52) U.S. Cl.
CPC ............... *C08L 67/03* (2013.01); *B29B 9/12* (2013.01); *C08G 65/34* (2013.01); *C08L 61/18* (2013.01); *C08L 71/00* (2013.01); *C08L 79/08* (2013.01); *C08L 81/06* (2013.01); *B29K 2067/00* (2013.01); *B29K 2071/00* (2013.01); *B29K 2081/06* (2013.01)

(58) Field of Classification Search
CPC .......... B33Y 70/00; B33Y 70/10; B33Y 80/00
See application file for complete search history.

(56) References Cited

U.S. PATENT DOCUMENTS

| | | | | |
|---|---|---|---|---|
| 5,019,615 A | * | 5/1991 | Mizuno | .................. C08L 71/12 |
| | | | | 524/100 |
| 6,353,050 B1 | * | 3/2002 | Bastiaens | .............. C08L 53/025 |
| | | | | 525/434 |
| 8,454,866 B2 | | 6/2013 | Herve et al. | |
| 2004/0258910 A1 | | 12/2004 | Haile et al. | |
| 2008/0160859 A1 | | 7/2008 | Gupta et al. | |
| 2009/0163449 A1 | | 6/2009 | Wempe | |
| 2009/0163603 A1 | | 6/2009 | Wempe | |
| 2012/0181720 A1 | | 7/2012 | Gupta et al. | |
| 2012/0302119 A1 | | 11/2012 | Clark et al. | |
| 2015/0259531 A1 | | 9/2015 | El-Hibri et al. | |

FOREIGN PATENT DOCUMENTS

| | | |
|---|---|---|
| CN | 103937213 A | 7/2014 |
| JP | 2010024409 A | 2/2010 |
| WO | 9207912 A1 | 5/1992 |
| WO | 2016102330 A1 | 6/2016 |

OTHER PUBLICATIONS

Schmid M. et al., "Materials Perspective of Polymers for Additive Manufacturing With Selective Laser Sintering", J. Mater. Res., 2014, vol. 29 N° 17, 1824-1832.

* cited by examiner

*Primary Examiner* — Christopher M Rodd
(74) *Attorney, Agent, or Firm* — Osha Bergman Watanabe & Burton LLP

(57) ABSTRACT

The invention relates to a process for preparing polymeric particles, based on the use of a polyester polymer (PE) comprising units from a dicarboxylic acid component and a diol component, wherein at least 2 mol. % of the diol component is a poly(alkylene glycol). The process comprises the melt-blending of the aromatic polymer (P) with the PE, the cooling the blend and the recovery of the particles by dissolution of the PE into water. The present invention relates to polymeric particles obtained therefrom and to the use of these particles in SLS 3D printing, coatings and toughening of thermoset resins.

21 Claims, 2 Drawing Sheets

PROCESS FOR PREPARING PARTICLES OF AROMATIC POLYMERS, PARTICLES OBTAINABLE BY SAID PROCESS AND THEIR USES

RELATED APPLICATIONS

This application claims is a U.S. national stage entry under 35 U.S.C. § 371 of International Application No. PCT/EP2018/062424 filed May 14, 2018, which priority to U.S. provisional application No. 62/516,404 filed on Jun. 7, 2017 and to European application No. 17184269.3 filed Aug. 1, 2017, the whole content of each of these applications being incorporated herein by reference for all purposes.

TECHNICAL FIELD

The present invention relates to a process for preparing particles of aromatic polymer, based on the use of a polyester polymer (PE) comprising units from a dicarboxylic acid component and a diol component, wherein at least 2 mol. % of the diol component is a poly(alkylene glycol). The process comprises the melt-blending of the aromatic polymer (P) with the PE, the cooling the blend and the recovery of the particles by dissolution of the PE into water. The present invention also relates to polymeric particles obtained therefrom and to the use of these particles in SLS 3D printing, coatings and toughening of thermoset resins.

BACKGROUND

Additive manufacturing systems are used to print or otherwise build 3D objects from a digital blueprint created with computer-aided design (CAD) modelling software. Selective laser sintering ("SLS"), one of the available additive manufacturing techniques, uses electromagnetic radiation from a laser to fuse powdered materials into a mass. The laser selectively fuses the powdered material by scanning cross-sections generated from the digital blueprint of the object on the surface of a powder bed. After a cross-section is scanned, the powder bed is lowered by one layer thickness, a new layer of material is applied, and the bed is rescanned. Locally full coalescence of polymer particles in the top powder layer is necessary as well as an adhesion with previous sintered layers. This process is repeated until the object is completed.

The article of Schmid et al. (J. Mater. Res, Vol 29, No. 17, 2014) reviews the properties of polymers and their powdered forms for SLS 3D Printing. The particles should be spherical to induce a free-flowing behaviour and be distributed on the powder bed of the printer by roller or blade systems. Spherical particles with a particle size distribution between 20 and 80 µm are generally optimal for operation on SLS equipment.

Spherical polymer powders can be prepared by a process called prilling, according to which the polymer is dissolved in an organic solvent, followed by precipitation into a large volume of non-solvent. First, the use of solvents generates substantial environmental and disposal problems. Second, this process requires that the polymer be soluble into the organic solvent at a sufficient level for efficient processing. Polyarylether polymers are however insoluble in most common solvents.

U.S. Pat. No. 8,454,866 B2 discloses preparation of powders of aliphatic polyamides by forming a melt blend with an additive which is a block copolymer comprising poly(alkylene oxide) blocks. These blends are disintegrated in water, to produce a dispersion of polyamide particles that can then be isolated by filtration and drying. The poly (alkylene oxide) polymers described in this patent while useful for preparing aliphatic polyamide powders, lack the thermal stability to be used with the high performance aromatic polymers.

One of the objects of the present invention is to provide a process for preparing spherical polymeric particles without using organic solvents.

Another object of the invention is to provide polymeric particles well-suited for the SLS 3D printing, coating compositions and toughening of thermoset resins.

DISCLOSURE OF THE INVENTION

Figure 1:
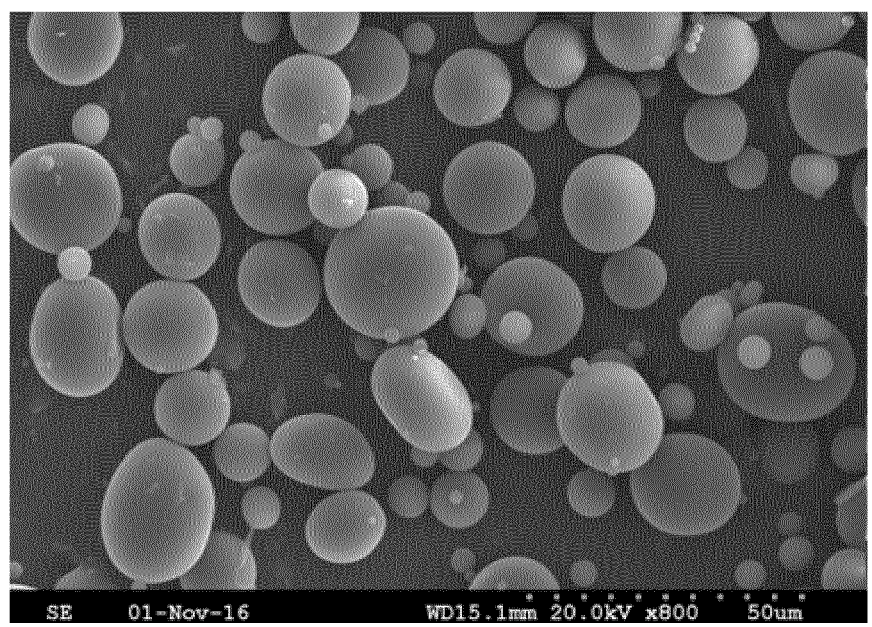
FIG. 1 is a scanning electron microscopy (SEM) image of the PEEK-PEDEK particles of Example 1.

A first object of the present invention is a process for preparing spherical polymeric particles without using organic solvents. The merit of the Applicant has been to identify a class of materials, hereby called polyester polymer (PE), having a thermal stability sufficient to be melt-blend with certain aromatic polymer, which makes possible the preparation of spherical polymeric particles and that are suitable for co-processing with high temperature aromatic polymers. The PE polymer of the present invention withstands high temperatures, that-is-to-say notably does not degrade significantly at high temperatures, for example above 250° C. Additionally, the polyester polymer (PE) is such that it can be dissolved in water, possibly heated to a temperature up to 95° C., possibly supplemented with an acid or a base. The PE polymer of the invention therefore not only presents a thermal stability sufficient to be melt-blended with polymeric polymers, but is also water-soluble.

The process of the present invention is based on the melt-blending of aromatic polymer with a water-soluble polyester (PE), in such a way as to create polymeric particles dispersed in a phase made of the water-soluble polyester (PE), for example by applying a mixing energy sufficient to create discrete particles. The blend is then cooled down and the particles are recovered by dissolution of the polyester in water, possibly heated to a temperature up to 95° C., possibly supplemented with an acid or a base.

In the present application:

any description, even though described in relation to a specific embodiment, is applicable to and interchangeable with other embodiments of the present disclosure;

where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and any recitation herein of numerical ranges by endpoints includes all numbers subsumed within the recited ranges as well as the endpoints of the range and equivalents.

More precisely, the present invention relates to a process for preparing polymeric particles, comprising the following steps:
melt-blending a mixture (M) comprising:
a) at least one polymer (P) selected from the group consisting of poly(aryl ether ketone) (PAEK), poly (aryl ether sulfone) (PAES), polyetherimide (PEI), poly(phenyl ether) (PPE), aromatic polyamideimide (PAI) and polyphenylene (PPh), and
b) at least one polyester polymer (PE) comprising units from:
at least one dicarboxylic acid component,
at least one diol component, wherein at least 2 mol. % of the diol component is a poly(alkylene glycol) having a formula (I):

$H(O-C_mH_{2m})_n-OH$ wherein m is an integer from 2 to 4 and n varies from 2 to 10,
processing the mixture (M) into pellets or strands,
optionally cooling the pellets or strands at a temperature below 80° C.,
contacting said pellets or strands with water, optionally heated to a temperature up to 95° C., optionally supplemented with an acid or a base,
recovering the particles,
optionally drying the particles, and
optionally sieving the particles.

More generally, the step consisting in melt-blending the mixture (M) can take place with any suitable device, such as endless screw mixers or stirrer mixers, for example compounder, compatible with the temperature needed to melt the aromatic polymer. The amount of energy applied to this step may be adjusted so as to control the size of the polymeric particles obtained therefrom. The skilled person in the art can adjust the equipment (e.g. screw geometry) and the parameters of the equipment (e.g. rotation speed) to obtain particles of the desired size, for example with an average diameter varying between about 0.5 μm and about 500 μm.

According to an embodiment:
in case a semi-crystalline polymer (P) is used, the step of melt-blending takes place at a temperature chosen to be at least 10° C. above the melting temperature (Tm) of the polymer, for example at least 15° C. or 20° C. above Tm,
in case an amorphous polymer (P) is used, the step of melt-blending takes place at a temperature chosen to be or at least 50° C. above the glass transition temperature (Tg) of the amorphous polymer.

According to a preferred embodiment, the step of melt-blending takes place at a temperature above 250° C., for example above 260° C., above 270° C. or above 280° C.

The step consisting in processing the mixture into pellets or strands can be carried out by a process of extrusion through a die.

The steps of melt-blending and processing into pellets or strands preferably tale place in an extruder equipped with an extrusion die.

The step of cooling is conducted by any appropriate means, at a temperature lower than 80° C., for example lower than 50° C. Mention can notably be made of air cooling or quenching in a liquid, for example in water.

The stage of contacting the pellets or strands with water may consist in a step of immersing the same into water, possibly multiple bath of water. The water is optionally heated to a temperature up to 95° C., for example to a temperature of about 40° C., about 60° C. or about 80° C.

The water can also be supplemented with an acid or a base, for example selected from the group consisting of potassium hydroxide, sodium hydroxide, lithium hydroxide, potassium carbonate, sodium carbonate, lithium carbonate, organic amines, hydrochloric acid and sulphuric acid. This step allows dissolution or dispersion of the polyester so as to recover the polymeric particles.

The steps of the process of the present invention can be carried out batch-wise or continuously.

According to an embodiment, the steps of cooling the pellets or strands at a temperature below 80° C., for example lower than 50° C. and contacting said pellets or strands with water, for example by immersion of the pellets or strands into water, can be carried out simultaneously in the same equipment.

The process of the invention may also comprise an additional step of drying of the particles, and/or an additional step of sieving the particles. The step of drying can for example take place in a fluidized bed.

According to an embodiment of the present invention, the polymer (P) is aromatic and selected from the group consisting of poly(aryl ether ketone) (PAEK), poly(aryl ether sulfone) (PAES), polyetherimide (PEI), poly(phenyl ether) (PPE), aromatic polyamideimide (PAI) and polyphenylene (PP).

According to an embodiment, the mixture (M) of the present invention comprises at least two distinct polymers selected from the group consisting of poly(aryl ether ketone) (PAEK), poly(aryl ether sulfone) (PAES), polyetherimide (PEI), poly(phenyl ether) (PPE), aromatic polyamideimide (PAI) and polyphenylene (PP), preferably at least one poly (aryl ether ketone) (PAEK) and at least one poly(aryl ether sulfone) (PAES).

Poly(Aryl Ether Ketone) (PAEK)

As used herein, a "poly(aryl ether ketone) (PAEK)" denotes any polymer comprising more than 50 mol. % of recurring units ($R_{PAEK}$) comprising a Ar'—C(=O)—Ar* group, where Ar' and Ar*, equal to or different from each other, are aromatic groups, the mol. % being based on the total number of moles in the polymer. The recurring units ($R_{PAEK}$) are selected from the group consisting of units of formulae (J-A) to (J-D) below:

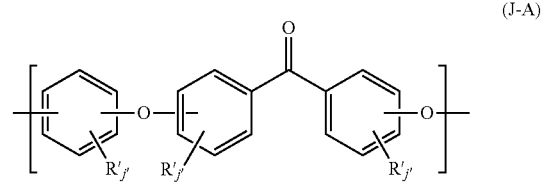
(J-A)

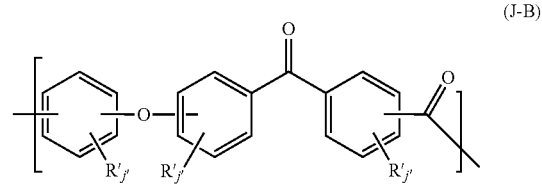
(J-B)

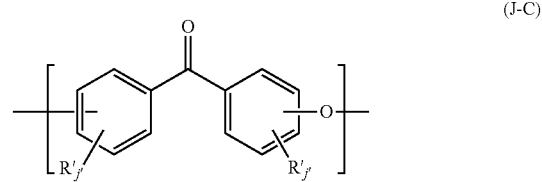
(J-C)

-continued (J-D)

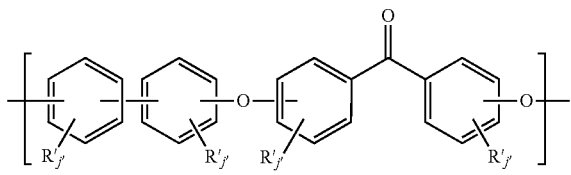

where:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j' is zero or an integer ranging from 1 to 4.

In recurring unit ($R_{PAEK}$), the respective phenylene moieties may independently have 1,2-, 1,4- or 1,3-linkages to the other moieties different from R' in the recurring unit ($R_{PAEK}$). Preferably, the phenylene moieties have 1,3- or 1,4-linkages, more preferably they have a 1,4-linkage.

In recurring units ($R_{PAEK}$), j' is preferably at each occurrence zero so that the phenylene moieties have no other substituents than those linking the main chain of the polymer.

In some embodiments, the PAEK is poly(ether ether ketone) (PEEK). As used herein, a "poly(ether ether ketone) (PEEK)" denotes any polymer of which more than 50 mol. % of the recurring units ($R_{PAEK}$) are recurring units of formula J'-A, the mol. % being based on the total number of moles in the polymer:

(J'-A)

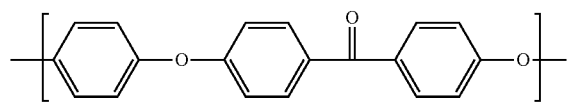

Preferably at least 60 mol. %, 70 mol. %, 80 mol. %, 90 mol. %, 95 mol. %, 99 mol. %, and most preferably all of recurring units ($R_{PAEK}$) are recurring units (J'-A).

In another preferred embodiment, the PAEK is poly(ether ketone ketone) (PEKK). As used herein, a "poly(ether ketone ketone) (PEKK)" denotes any polymer of which more than 50 mol. % of the recurring units ($R_{PAEK}$) are a combination of recurring units of formula J'-B and formula J"-B, the mol. % being based on the total number of moles in the polymer:

(J'-B)

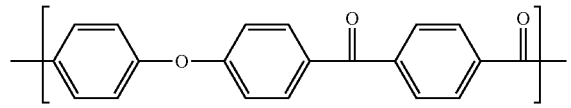

(J"-B)

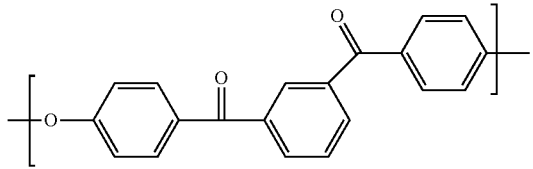

Preferably at least 60 mol. %, 70 mol. %, 80 mol. %, 90 mol. %, 95 mol. %, 99 mol. %, and most preferably all of recurring units ($R_{PAEK}$) are a combination of recurring units (J'-B) and (J"-B).

In yet another preferred embodiment, the PAEK is poly(ether ketone) (PEK). As used herein, a "poly(ether ketone) (PEK)" denotes any polymer of which more than 50 mol. % of the recurring units ($R_{PAEK}$) are recurring units of formula (J'-C), the mol. % being based on the total number of moles in the polymer:

(J'-C)

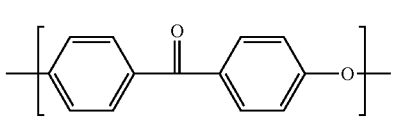

Preferably at least 60 mol. %, 70 mol. %, 80 mol. %, 90 mol. %, 95 mol. %, 99 mol. %, and most preferably all of recurring units ($R_{PAEK}$) are recurring units (J'-C).

In some embodiments, the PAEK is a PEEK-PEDEK copolymer. As used herein, a "PEEK-PEDEK copolymer" denotes any polymer of which more than 50 mol. % of the recurring units ($R_{PAEK}$) are both recurring units of formula J'-A (PEEK) and formula J'-D (poly(diphenyl ether ketone) (PEDEK)), the mol. % being based on the total number of moles in the polymer:

(J'-D)

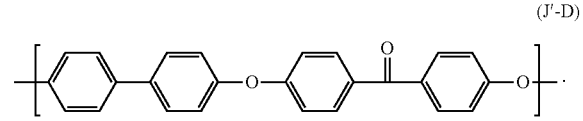

The PEEK-PEDEK copolymer may include relative molar proportions of recurring units J'-A and J'-D (PEEK/PEDEK) ranging from 95/5 to 60/40. Preferably the sum of recurring units J'-A and J'-D represents at least 60 mol. %, 70 mol. %, 80 mol. %, 90 mol. %, 95 mol. %, 99 mol. %, of recurring units in the PAEK. In some aspects, recurring units J'-A and J'-D represent all of the recurring units in the PAEK.

Most preferably, the PAEK is PEEK or PEEK-PEDEK.

KETASPIRE® PEEK is commercially available from Solvay Specialty Polymers USA, LLC.

Poly(Aryl Ether Sulfone) (PAES)

For the purpose of the present invention, a "poly(aryl ether sulfone) (PAES)" denotes any polymer of which at least 50 mol. % of the recurring units are recurring units ($R_{PAES}$) of formula (K), the mol. % being based on the total number of moles in the polymer:

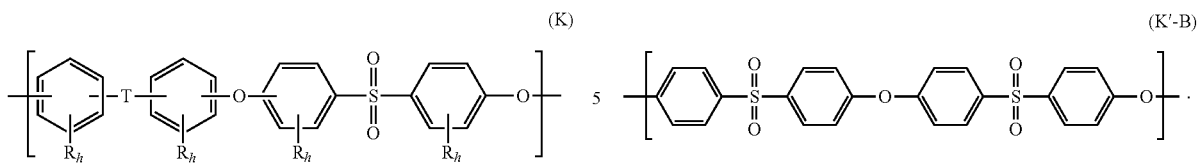

where
- each R, equal to or different from each other, is selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;
- each h, equal to or different from each other, is an integer ranging from 0 to 4; and
- T is selected from the group consisting of a bond, a sulfone group [—S(=O)$_2$—], and a group —C(R$_j$)(R$_k$)—, where R$_j$ and R$_k$, equal to or different from each other, are selected from a hydrogen, a halogen, an alkyl, an alkenyl, an alkynyl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium.

T is preferably a bond, a sulfone group or a group —C(R$_j$)(R$_k$)— in which R$_j$ and R$_k$ are preferably methyl groups.

Preferably at least 60 mol. %, 70 mol. %, 80 mol. %, 90 mol. %, 95 mol. %, 99 mol. %, and most preferably all of recurring units in the PAES are recurring units (R$_{PAES}$).

In one embodiment, the PAES is a polyphenylsulfone (PPSU). As used herein, a "polyphenylsulfone (PPSU)" denotes any polymer of which more than 50 mol. % of the recurring units are recurring units of formula (K'-A), the mol. % being based on the total number of moles in the polymer:

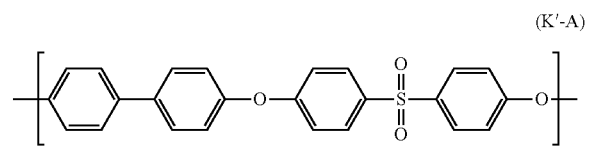

Preferably at least 60 mol. %, 70 mol. %, 80 mol. %, 90 mol. %, 95 mol. %, 99 mol. %, and most preferably all of the recurring units in the PPSU are recurring units of formula (K'-A).

PPSU can be prepared by known methods and is notably available as RADEL® PPSU from Solvay Specialty Polymers USA, L.L.C.

In some embodiments, the PAES is a polyethersulfone (PES). As used herein, a "polyethersulfone (PES)" denotes any polymer of which at least 50 mol. % of the recurring units are recurring units of formula (K'-B), the mol. % being based on the total number of moles in the polymer:

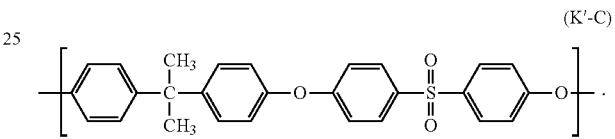

Preferably at least 60 mol. %, 70 mol. %, 80 mol. %, 90 mol. %, 95 mol. %, 99 mol. %, and most preferably all of the recurring units in the PES are recurring units of formula (K'-B).

PES can be prepared by known methods and is notably available as VERADEL® PESU from Solvay Specialty Polymers USA, L.L.C.

In some embodiments, the PAES is a polysulfone (PSU). As used herein, a "polysulfone (PSU)" denotes any polymer of which at least 50 mol. % of the recurring units are recurring units of formula (K'-C), the mol. % being based on the total number of moles in the polymer:

Preferably at least 60 mol. %, 70 mol. %, 80 mol. %, 90 mol. %, 95 mol. %, 99 mol. %, and most preferably all of the recurring units in the PSU are recurring units of formula (K'-C).

PSU can be prepared by known methods and is available as UDEL® PSU from Solvay Specialty Polymers USA, L.L.C.

According to the present invention, the weight average molecular weight Mw of the PPSU may be from 30,000 to 80,000 g/mol, for example from 35,000 to 75,000 g/mol or from 40,000 to 70,000 g/mol.

According to the present invention, the weight average molecular weight Mw of the PSU may be from 30,000 to 80,000 g/mol, for example from 35,000 to 75,000 g/mol or from 40,000 to 70,000 g/mol.

The weight average molecular weight (Mw) of PAES, for example PPSU, PES and PSU, can be determined by gel permeation chromatography (GPC) using methylene chloride as a mobile phase (2×5μ mixed D columns with guard column from Agilent Technologies; flow rate: 1.5 mL/min; injection volume: 20 μL of a 0.2 w/v % sample solution), with polystyrene standards.

More precisely, the weight average molecular weight (Mw) can be measured by gel permeation chromatography (GPC), using methylene chloride as the mobile phase. In the experimental part, the following method was used: two 5μ mixed D columns with guard column from Agilent Technologies were used for separation. An ultraviolet detector of 254 nm was used to obtain the chromatogram. A flow rate of 1.5 ml/min and injection volume of 20 μL of a 0.2 w/v % solution in mobile phase was selected. Calibration was performed with 12 narrow molecular weight polystyrene standards (Peak molecular weight range: 371,000 to 580 g/mol). The weight average molecular weight (Mw) was reported.

Polyetherimide (PEI)

For the purpose of the present invention, a "polyetherimide (PEI)"

comprises at least 50 mol. %, based on the total number of moles in the polymer, of recurring units ($R_{PEI}$) comprising at least one aromatic ring, at least one imide group, as such and/or in its amic acid form, and at least one ether group. Recurring units ($R_{PEI}$) may optionally further comprise at least one amide group which is not included in the amic acid form of an imide group.

According to an embodiment, the recurring units ($R_{PEI}$) are selected from the group consisting of following formulas (I), (II), (III), (IV), (V) and mixtures thereof:

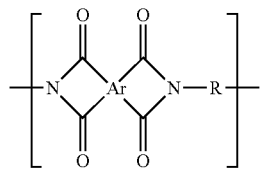

(I)

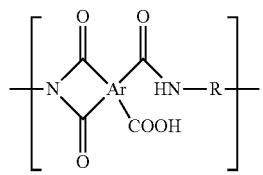

(II)

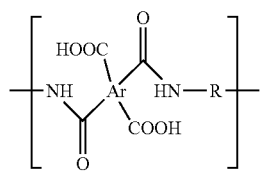

(III)

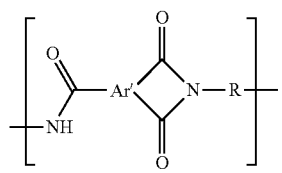

(IV)

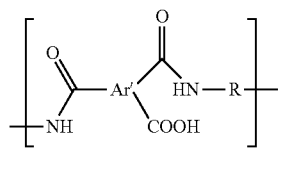

(V)

where

Ar is a tetravalent aromatic moiety and is selected from the group consisting of a substituted or unsubstituted, saturated, unsaturated or aromatic monocyclic and polycyclic group having 5 to 50 carbon atoms;

Ar' is a trivalent aromatic moiety and is selected from the group consisting of a substituted, unsubstituted, saturated, unsaturated, aromatic monocyclic and aromatic polycyclic group having from 5 to 50 carbon atoms; and R is selected from the group consisting of substituted and unsubstituted divalent organic radicals, for example selected from the group consisting of (a) aromatic hydrocarbon radicals having 6 to 20 carbon atoms and halogenated derivatives thereof;

(b) straight or branched chain alkylene radicals having 2 to 20 carbon atoms;

(c) cycloalkylene radicals having 3 to 20 carbon atoms, and (d) divalent radicals of formula (VI):

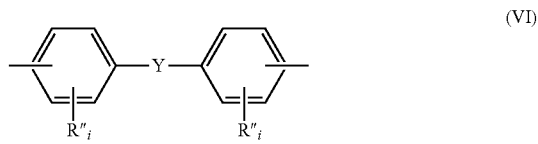

(VI)

where

Y is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —O(O)—; —SO$_2$—; —SO—, and R" is selected from the group consisting of hydrogen, halogen, alkyl, alkenyl, alkynyl, aryl, ether, thioether, carboxylic acid, ester, amide, imide, alkali earth metal sulfonate, alkaline earth metal sulfonate, alkyl sulfonate, alkali earth metal phosphonate, alkaline earth metal phosphonate, alkyl phosphonate, amine and quaternary ammonium and i, for each R", is independently zero or an integer ranging from 1 to 4, with the proviso that at least one of Ar, Ar' and R comprise at least one ether group and that the ether group is present in the polymer chain backbone.

According to an embodiment, Ar is selected from the group consisting of formulas:

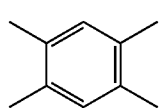

(VII)

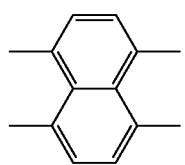

(VIII)

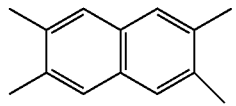

(IX)

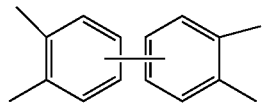

(X)

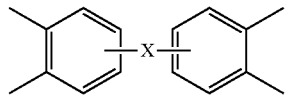

(XI)

where

X is a divalent moiety, having divalent bonds in the 3,3', 3,4', 4,3" or the 4,4' positions and is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —O(O)—; —SO$_2$—; —SO—;

or X is a group of the formula —O—Ar"—O—, wherein Ar" is a aromatic moiety selected from the group consisting of a substituted or unsubstituted, saturated, unsaturated or aromatic monocyclic and polycyclic group having 5 to 50 carbon atoms.

According to an embodiment, Ar' is selected from the group consisting of formulas:

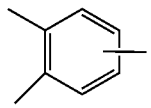
(XII)

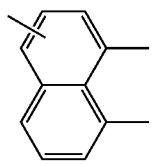
(XIII)

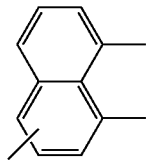
(XIV)

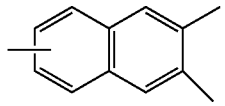
(XV)

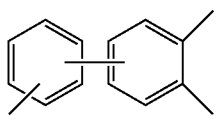
(XVI)

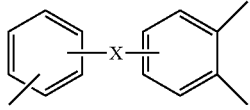
(XVII)

where

X is a divalent moiety, having divalent bonds in the 3,3', 3,4', 4,3" or the 4,4' positions and is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —O(O)—; —SO$_2$—; —SO—;

or X is a group of the formula —O—Ar"—O—, wherein Ar" is a aromatic moiety selected from the group consisting of a substituted or unsubstituted, saturated, unsaturated or aromatic monocyclic and polycyclic group having 5 to 50 carbon atoms.

According to an embodiment of the present disclosure, at least 50 mol. %, at least 60 mol. %, at least 70 mol. %, at least 80 mol. %, at least 90 mol. %, at least 95 mol. %, at least 99 mol. % or all of the recurring units in the PEI are recurring units (R$_{PEI}$) of formulas (I), (II), (III), (IV), (V) and/or mixtures thereof, as defined above.

According to an embodiment, the PEI comprises at least 50 mol. %, based on the total number of moles in the polymer, of recurring units (R$_{PEI}$) of formula (VII):

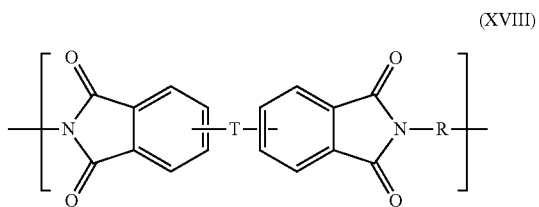
(XVIII)

where

R is selected from the group consisting of substituted and unsubstituted divalent organic radicals, for example selected from the group consisting of (a) aromatic hydrocarbon radicals having 6 to 20 carbon atoms and halogenated derivatives thereof;

(b) straight or branched chain alkylene radicals having 2 to 20 carbon atoms;

(c) cycloalkylene radicals having 3 to 20 carbon atoms, and (d) divalent radicals of formula (VI):

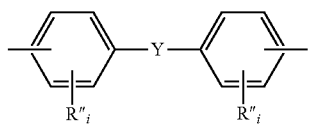
(VI)

where

Y is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —O(O)—; —SO$_2$—; —SO—, and R" is selected from the group consisting of hydrogen, halogen, alkyl, alkenyl, alkynyl, aryl, ether, thioether, carboxylic acid, ester, amide, imide, alkali earth metal sulfonate, alkaline earth metal sulfonate, alkyl sulfonate, alkali earth metal phosphonate, alkaline earth metal phosphonate, alkyl phosphonate, amine and quaternary ammonium and i, for each R", is independently zero or an integer ranging from 1 to 4, with the proviso that at least one of Ar, Ar' and R comprise at least one ether group and that the ether group is present in the polymer chain backbone.

T can either be

—O— or —O—Ar"—O— wherein the divalent bonds of the —O— or the —O—Ar"—O— group are in the 3,3', 3,4', 4,3', or the 4,4' positions, wherein Ar" is a aromatic moiety selected from the group consisting of a substituted or unsubstituted, saturated, unsaturated or aromatic monocyclic and polycyclic group having 5 to 50 carbon atoms, for example a substituted or unsubstituted phenylene, a substituted or unsubstituted biphenyl group, a substituted or unsubstituted naphthalene group or a moiety comprising two substituted or unsubstituted phenylene groups.

According to an embodiment of the present disclosure, Ar" is of the general formula (VI), as detailed above; for example, Ar" is of formula (XIX):

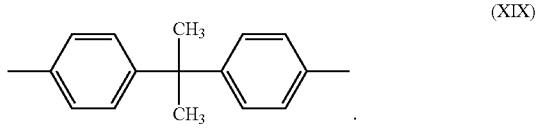
(XIX)

The polyetherimides (PEI) of the present invention may be prepared by any of the methods well-known to those skilled in the art including the reaction of a diamino compound of the formula $H_2N—R—NH_2$ (XX), where R is as defined before, with any aromatic bis(ether anhydride)s of the formula (XXI):

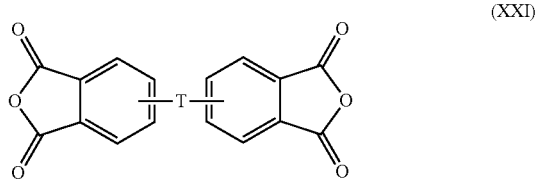
(XXI)

where T as defined before.

In general, the preparation can be carried out in solvents, e.g. o-dichlorobenzene, m-cresol/toluene, N,N-dimethylacetamide, at temperatures ranging from 20° C. to 250° C.

Alternatively, these polyetherimides can be prepared by melt polymerization of any dianhydrides of formula (XXI) with any diamino compound of formula (XX) while heating the mixture of the ingredients at elevated temperatures with concurrent intermixing.

The aromatic bis(ether anhydride)s of formula (XXI) include, for example: 2,2-bis[4-(2,3-dicarboxyphenoxy)phenyl]propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; 2,2-bis[4 (3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis (3,4-dicarboxyphenoxy)benzene dianhydride; 4,4'-bis(3,4-dicarboxyphenoxy)benzophenone dianhydride; 4-(2,3-dicarboxyphenoxy)-4'-(3,4-dicarboxyphenoxy)diphenyl-2,2-propane dianhydride; and mixtures of such dianhydrides.

The organic diamines of formula (XX) are chosen from the group consisting of m-phenylenediamine, p-phenylenediamine, 2,2-bis(p-aminophenyl)propane, 4,4'-diaminodiphenyl-methane, 4,4'-diaminodiphenyl sulfide, 4,4'-diamino diphenyl sulfone, 4,4'-diaminodiphenyl ether, 1,5-diaminonaphthalene, 3,3'-dimethylbenzidine, 3,3'-dimethoxybenzidine, and mixtures thereof; preferably, the organic diamines of formula (XX) are chosen from the group consisting of m-phenylenediamine and p-phenylenediamine and mixture thereof.

According to an embodiment, the PEI comprises at least 50 mol. %, based on the total number of moles in the polymer, of recurring units ($R_{PEI}$) of formulas (XXIII) or (XXIV), in imide forms, or their corresponding amic acid forms and mixtures thereof:

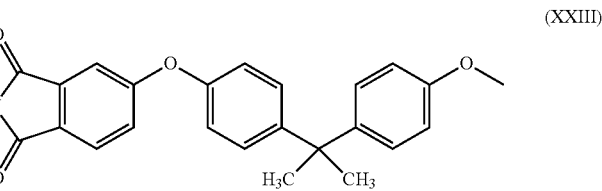
(XXIII)

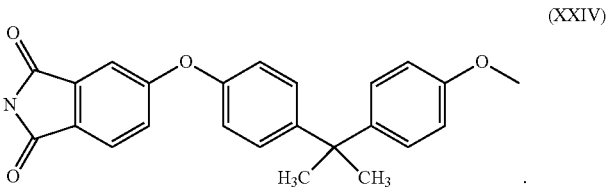
(XXIV)

In a preferred embodiment of the present invention, at least 50 mol. %, at least 60 mol. %, at least 70 mol. %, at least 80 mol. %, at least 90 mol. %, at least 95 mol. %, at least 99 mol. % or all of the recurring units in P1 and/or P2 are recurring units ($R_{PEI}$) of formulas (XXIII) or (XXIV), in imide forms, or their corresponding amic acid forms and mixtures thereof.

Aromatic polyimides are commercially available from Sabic Innovative Plastics as ULTEM® polyetherimides.

In a specific embodiment, the PEI has a Tg ranging from 160 and 270° C., as measured by differential scanning calorimetry (DSC) according to ASTM D3418, for example ranging from 170 and 260° C., from 180 and 250° C.

Poly(Phenyl Ether) (PPE)

The term "poly(phenyl ether) (PPE)" is intended to denote a polymer comprising at least 50 mol. % of recurring units ($R_{PPE}$) of formula (W):

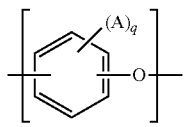

(W)

wherein (i) A are independently selected from a C1-C30 alkyl groups, and (ii) q is 0, 1, 2, 3 or 4.

In a preferred embodiment, at least 60 mol. %, 70 mol. %, 80 mol. %, 90 mol. %, 95 mol. %, 99 mol. %, and most preferably all recurring units in the PPE are recurring units ($R_{PPE}$).

In a preferred embodiment, A represents CH3 and q is 2.

In a preferred embodiment, the phenylene moieties in the PPE have 1,4-linkages.

In a preferred embodiment, the poly(phenyl ether) is poly(p-phenylene oxide) (PPO). As used herein, a "poly (para-phenylene oxide) (PPO)" denotes any polymer of which at least 50 mol. % of the recurring units are recurring units ($R_{PPO}$) of formula (W'):

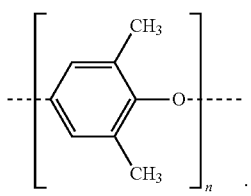

(W')

Polyamideimide (PAI)

As used herein, a polyamideimide or aromatic polyamide-imide polymer (PAI) comprises at least 50 mol. % of recurring units ($R_{PAI}$) comprising at least one aromatic ring, at least one imide group, as such and/or in its amic acid form, and at least one amide group which is not included in the amic acid form of an imide group.

The recurring units ($R_{PAI}$) are advantageously chosen among formula:

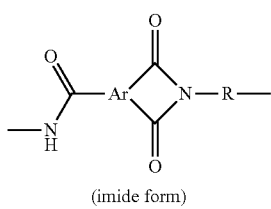

$R_{PAI}$-a (imide form)

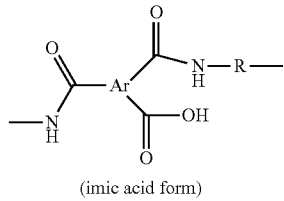

$R_{PAI}$-b (imic acid form)

where:

Ar (trivalent aromatic group) is selected from the group consisting of the following structures:

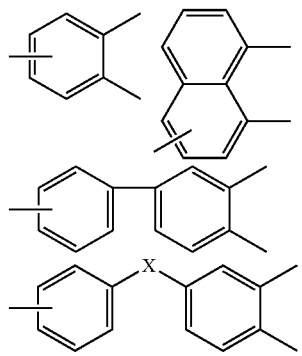

and corresponding optionally substituted structures, with X being —O—, —C(O)—, —CH2-, —C(CH3)2-, —C(CF3)2-, —(CF2)q-, with q being an integer from 1 to 5;

R is a divalent aromatic group; typically R is selected from the group consisting of following structures:

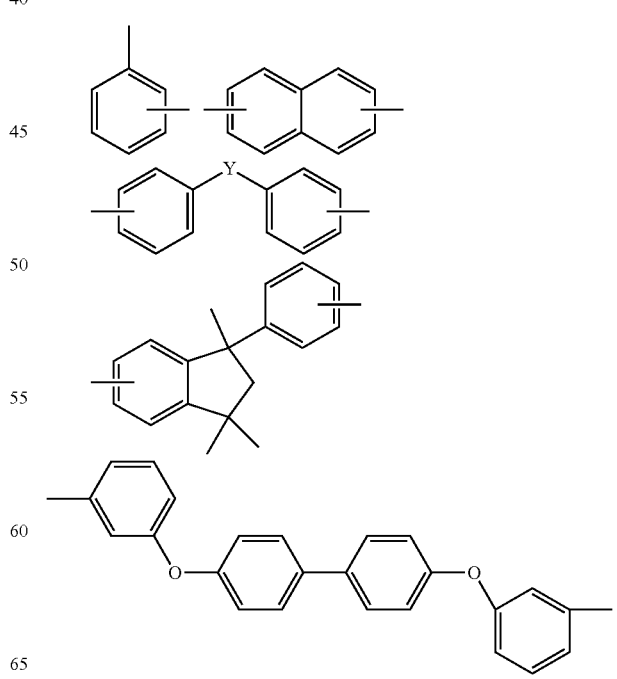

and corresponding optionally substituted structures, with Y being —O—, —S—, —SO$_2$—, —CH$_2$—, —C(O)—, —C(CH$_3$)$_2$—, —C(CF$_3$)$_2$—, —(CF$_2$)$_q$, q being an integer from 1 to 5.

Preferably, the aromatic polyamide-imide comprises more than 50% of recurring units (R$_{PAI}$) comprising an imide group in which the imide group is present as such, like in recurring units (R$_{PAI}$-a), and/or in its amic acid form, like in recurring units (R$_{PAI}$-b).

Recurring units (R$_{PAI}$) are preferably chosen from recurring units (l), (m) and (n), in their amide-imide (a) or amide-amic acid (b) forms:

(l)

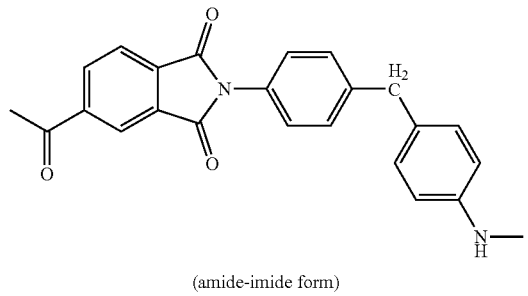
(amide-imide form)

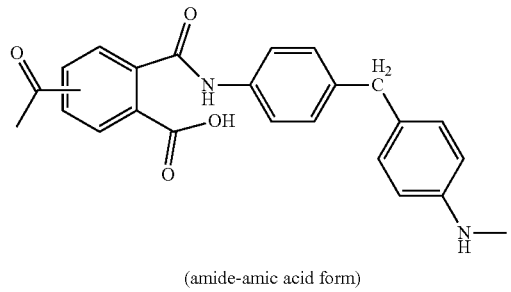
(amide-amic acid form)

wherein the attachment of the two amide groups to the aromatic ring as shown in (l-b) will be understood to represent the 1,3 and the 1,4 polyamide-amic acid configurations;

(m)

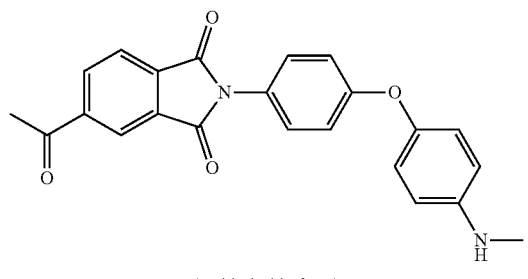
(amide-imide form)

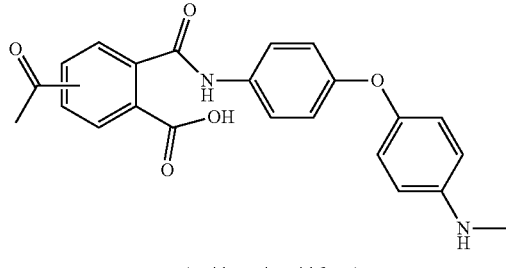
(amide-amic acid form)

wherein the attachment of the two amide groups to the aromatic ring as shown in (m-b) will be understood to represent the 1,3 and the 1,4 polyamide-amic acid configurations; and (n)

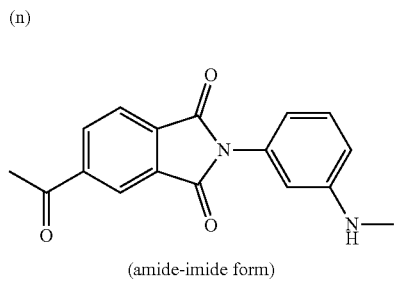
(amide-imide form)

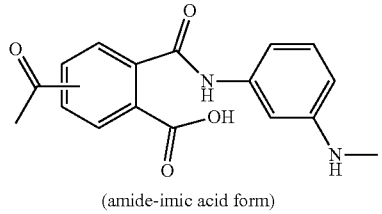
(amide-imic acid form)

wherein the attachment of the two amide groups to the aromatic ring as shown in (n-b) will be understood to represent the 1,3 and the 1,4 polyamide-amic acid configurations.

More preferably, the polymer (PAI) comprises more than 90 mol. % of recurring units (R$_{PAI}$). Still more preferably, it consists essentially of recurring units (R$_{PAI}$).

PAI can be prepared by known methods and is available as TORLON® PAI, for example Torlon® 4000T, from Solvay Specialty Polymers USA, L.L.C.

Polyphenylene (PP)

As used herein, a polyphenylene polymer refers to any polymer comprising at least 50 mol. % repeat units (R$_{PP}$) of formula (F):

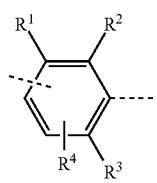

where $R^1$, $R^2$, $R^3$, and $R^4$ are each independently selected from the group consisting of a hydrogen, an alkyl, an aryl, an alkoxy, an aryloxy, an alkylketone, an arylketone, a fluoroalkyl, a fluoroaryl, a bromoalkyl, a bromoaryl, a chloroalkyl, a chloroaryl, an alkylsulfone, an arylsulfone, an alkylamide, an arylamide, an alkylester, an arylester, a fluorine, a chlorine, and a bromine.

In some embodiments, a polyphenylene polymer comprises at least about 60 mol. %, at least about 70 mol. %, at least about 80 mol. %, at least about 90 mol. %, at least about 95 mol. %, at least about 99 mol. % or at least about 99.9 mol. % repeat units (Rp).

In some embodiments, one or more of $R^1$, $R^2$, $R^3$, and $R^4$ are independently of formula (F'):

Ar-T-             (F')

where

Ar is selected from the following group of:

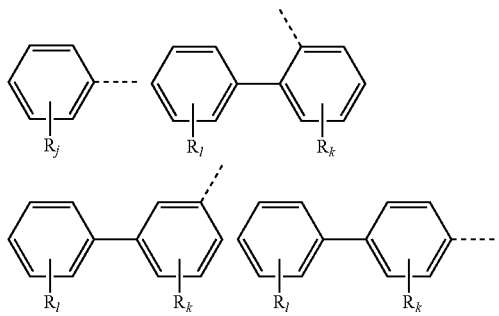

with each $R_j$, $R_k$ and $R_l$ is independently selected from the group consisting of hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and with j and l, equal or different from each other are independently 0, 1, 2, 3, 4, or 5 and, k, equal or different from j or l, is independently 0, 1, 2, 3 or 4;

where the dashed lined indicates a bond to T.

where T is selected from the group consisting of —$CH_2$—; —O—; —$SO_2$—; —S—; —C(O)—; C($CH_3$)$_2$—; —C($CF_3$)$_2$—; —C(=$CCl_2$)—; —C($CH_3$) ($CH_2CH_2COOH$)—; —N=N—; —$R_a$C=$CR_b$—, where each $R_a$ and $R_b$, independently of one another, is a hydrogen or a C1-C12 alkyl, C1-C12-alkoxy, or C6-C18-aryl group; —($CH_2$)$_n$— and —($CF_2$)$_n$— with n being an integer from 1 to 6; an aliphatic divalent group, linear or branched, of up to 6 carbon atoms; and combinations thereof.

In some embodiments, one or more of $R^1$, $R^2$, $R^3$, and $R^4$ can be represented by formula (F"):

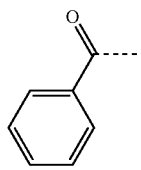             (F")

where, in formula (F"), the dashed bond indicates the bond to the benzyl moiety of repeat unit (Rp).

Polyphenylene copolymers are commercially available from Solvay Specialty Polymers, L.L.C. as PRIMOSPIRE® PR-120 polyphenylene and PRIMOSPIRE® SRP PR-250 polyphenylene.

Blends of Polymers (P)

According to an embodiment, the mixture (M) of the present invention comprises at least two distinct polymers (i.e. a blend of at least two polymers) selected from the group consisting of poly(aryl ether ketone) (PAEK), poly (aryl ether sulfone) (PAES), polyetherimide (PEI), poly (phenyl ether) (PPE), aromatic polyamideimide (PAI) and polyphenylene (PP).

Preferably, the mixture (M) of the present invention comprises a polymer blend of at least one poly(aryl ether ketone) (PAEK) and at least one poly(aryl ether sulfone) (PAES). The polymer blend can be prepared extemporary, for example using melt-mixing processes. Melt-mixing processes are typically carried out by heating the polymer components above the melting temperature of the thermoplastic polymers thereby forming a melt of the thermoplastic polymers. In some embodiments, the processing temperature ranges from about 280-450° C., preferably from about 290-440° C., from about 300-430° C. or from about 310-420° C. Suitable melt-mixing apparatus are, for example, kneaders, Banbury mixers, single-screw extruders, and twin-screw extruders. Preferably, use is made of an extruder fitted with means for dosing all the desired components to the extruder, either to the extruder's throat or to the melt. The polymer to be blended, e.g. PAES, PAEK and optionally additives, are fed to the melt-mixing apparatus and melt-mixed in that apparatus. The components may be fed simultaneously as a powder mixture or granule mixer, also known as dry-blend, or may be fed separately. The order of combining the components during melt-mixing is not particularly limited. In one embodiment, the component can be mixed in a single batch, such that the desired amounts of each component are added together and subsequently mixed. In other embodiments, a first sub-set of components can be initially mixed together and one or more of the remaining components can be added to the mixture for further mixing. For clarity, the total desired amount of each component does not have to be mixed as a single quantity. For example, for one or more of the components, a partial quantity can be initially added and mixed and, subsequently, some or all of the remainder can be added and mixed.

Polyester Polymer (PE)

According to the present invention, a "polyester polymer (PE)" denotes any polymer comprising units from:

at least one dicarboxylic acid component, at least one diol component, wherein at least 2 mol. % of the diol component is a poly(alkylene glycol) of formula (I):

H(O—$C_mH_{2m}$)$_n$—OH wherein m is an integer from 2 to 4 and n varies from 2 to 10.

According to an embodiment, the dicarboxylic acid component comprises at least one aromatic dicarboxylic acid, for example selected from the group consisting of isophthalic acid (IPA), terephthalic acid (TPA), naphthalendicarboxylic acids (e.g. naphthalene-2,6-dicarboxylic acid), 4,4'-bibenzoic acid, 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis (4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)

methane, 2,2-bis(3-carboxyphenyl)hexafluoropropane, 2,2-bis(3-carboxyphenyl)ketone, bis(3-carboxyphenoxy)benzene and mixture thereof.

According to an embodiment, the diol component is such that at least 2 mol. % of the diol component is a poly(ethylene glycol) of formula (II):

H(O—CH$_2$—CH$_2$)$_n$—OH wherein n varies from 2 to 10.

According to an embodiment, the diol component is such that at least 4 mol. %, at least 10 mol. %, at least 20 mol. %, at least 30 mol. %, at least 40 mol. % or at least 50 mol. % of the diol component (based on the total number of moles of the diol component) is a poly(alkylene glycol) of formula (I):

H(O—C$_m$H$_{2m}$)$_n$—OH wherein m is an integer from 2 to 4 and n varies from 2 to 10, preferably a poly(ethylene glycol) of formula (II):

H(O—CH$_2$—CH$_2$)$_n$—OH wherein n varies from 2 to 10.

According to another embodiment, the diol component is such that at least 2 mol. %, at least 4 mol. %, at least 10 mol. %, at least 20 mol. %, at least 30 mol. %, at least 40 mol. % or at least 50 mol. % of the diol component (based on the total number of moles of the diol component), is a diethylene glycol of formula HO—CH$_2$—CH$_2$—O—CH$_2$—CH$_2$—OH.

According to a further embodiment, apart from the 2 mol. % minimal content of poly(alkylene glycol), the diol component may comprise at least one diol selected from the group consisting of ethylene glycol, 1,4-cyclohexanedimethanol, propane-1,2-diol, 2,2-dimethyl-1,3-propanediol, 1,3-propanediol, 1,4-butanediol, 1,5-pentanediol, 1,6-hexanediol, 2-methyl-1,5-pentanediol, isosorbide and 2,5-bishydroxymethyltetrahydrofuran.

According to yet another embodiment, the diol component of the polyester polymer (PE) consists essentially in:
 a diol selected from the group consisting of consisting of ethylene glycol, 1,4-cyclohexanedimethanol, propane-1,2-diol, 2,2-dimethyl-1,3-propanediol, 1,3-propanediol, 1,4-butanediol, 1,5-pentanediol, 1,6-hexanediol, 2-methyl-1,5-pentanediol, isosorbide and 2,5-bishydroxymethyltetrahydrofuran,
 at least 2 mol. % of poly(ethylene glycol) having a formula (I):

H(O—CH$_2$—CH$_2$)$_n$—OH wherein n varies from 2 to 10.

According to another embodiment, the diol component of the polyester polymer (PE) consists essentially in:
 a diol selected from the group consisting of consisting of ethylene glycol, 1,4-cyclohexanedimethanol, propane-1,2-diol, 2,2-dimethyl-1,3-propanediol, 1,3-propanediol, 1,4-butanediol, 1,5-pentanediol, 1,6-hexanediol, 2-methyl-1,5-pentanediol, isosorbide and 2,5-bishydroxymethyltetrahydrofuran,
 at least 2 mol. % of diethylene glycol (based on the total number of diol components).

According to the present invention, preferred polyester (PE) are polyesters which further comprise recurring units from a difunctional monomer containing at least one SO$_3$M group attached to an aromatic nucleus, wherein the functional groups are carboxy and wherein M is H or a metal ion selected from the group consisting of sodium, potassium, calcium, lithium, magnesium, silver, aluminium, zinc, nickel, copper, palladium, iron, and cesium, preferably from the group consisting of sodium, lithium and potassium. Such preferred polyester are sometimes called sulfopolyester (SPE). According to this embodiment, the difunctional sulfomonomer can for example be present in the SPE in a molar ratio comprised between 1 to 40 mol. %, based on the total number of moles (i.e. total number of moles of diacid and diol components if the SPE is composed exclusively of diacid and diol components) in the SPE, for example between 5 and 35 mol. %, or between 8 to 30 mol. %.

According to an embodiment of the present invention, the polyester (PE) comprises units from:
 at least one dicarboxylic acid component,
 at least one diol component, wherein at least 2 mol. % of the diol component is a poly(alkylene glycol) of formula (I):

H(O—C$_m$H$_{2m}$)$_n$—OH wherein m is an integer from 2 to 4 and n varies from 2 to 10,
 at least one difunctional monomer containing at least one SO$_3$M group attached to an aromatic nucleus, wherein the functional groups are carboxy and wherein M is H or a metal ion selected from the group consisting of sodium, lithium and potassium.

According to another embodiment of the present invention, the polyester (PE) comprises units from:
 at least one aromatic dicarboxylic acid component,
 at least one diol component,
 at least 1 mol. % (based on the total number of units moles in the PE, e.g. total number of diacid and diol components if the PE is composed exclusively of diacid and diol units) of poly(alkylene glycol) of formula (I):

H(O—C$_m$H$_{2m}$)$_n$—OH wherein m is an integer from 2 to 4 and n varies from 2 to 10,
 at least one aromatic dicarboxylic acid containing at least one SO$_3$M group attached to an aromatic nucleus, wherein M is H or a metal ion selected from the group consisting of sodium, lithium and potassium.

According to a preferred embodiment of the present invention, the polyester (PE) comprises or consists essentially in units from:
 an aromatic dicarboxylic acid selected from the group consisting of isophthlaic acid (IPA), terephthalic acid (TPA), naphthalendicarboxylic acids (e.g. naphthalene-2,6-dicarboxylic acid), 4,4'-bibenzoic acid, 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone, bis(3-carboxyphenoxy)benzene and mixture thereof, preferably isophthalic acid,
 a diol selected from the group consisting of ethylene glycol, 1,4-cyclohexanedimethanol, propane-1,2-diol, 2,2-dimethyl-1,3-propanediol and mixture thereof,
 at least 2 mol. % (based on the total number of units moles in the PE, e.g. total number of diacid and diol components if the PE is composed exclusively of diacid and diol units) of poly(alkylene glycol) of diethylene glycol, an aromatic dicarboxylic acid (e.g. isophthalic acid, terepthalic acid, 2,6-naphthalene dicarboxylic acid) containing at least one $SO_3M$ group attached to an aromatic nucleus, wherein M is H or a metal ion selected from the group consisting of sodium, lithium and potassium.

According to an embodiment, the PE comprises at least 2 mol. %, at least 4 mol. %, at least 10 mol. %, at least 20 mol. %, at least 30 mol. %, at least 40 mol. % or at least 50 mol. % of diethylene glycol, based on the total number of units moles in the PE, e.g. total number of diacid and diol components if the PE is composed exclusively of diacid and diol units.

Illustrative of such polyesters are Eastman AQ Polymers, especially those having a glass transition temperature ranging from about 25° C. to about 50° C. Most preferred is Eastman AQ 38S which is a polyester identified as an diethylene glycol/cyclohexanedimethanol/isophthalates/sulfoisophthalates polyester.

The polyester (PE) of the present invention may be in the form of a salt of sulfonic acid or/and carboxylic acid, more precisely a sulfonate —$SO_3^-$ or a carboxylate —$COO^-$. The PE may therefore comprise one or several groups ($SO_3^-$ $M^+$) and/or ($COO^-$ $M^+$), in which M is a metal. According to an embodiment, M is selected from the group consisting of sodium, potassium or lithium, calcium, magnesium, silver, aluminium, zinc, nickel, copper, palladium, iron and cesium.

The polyesters (PE) of the present invention can for example be derived through esterification of the mentioned components.

The number average molecular weight Mn of the polyesters (PE) may be between 1,000 g/mol and 40,000 g/mol, more preferentially between 2,000 g/mol and 30,000 g/mol, as determined by GPC.

According to an embodiment, the PE polymer is present in the mixture (M) in an amount of at least 30 wt. %, at least 35 wt. %, at least 40 wt. %, at least 45 wt. %, at least 50 wt. %, at least 55 wt. %, at least 60 wt. %, at least 65 wt. %, at least 70 wt. %, at least 75 wt. % or at least 80 wt. %, based on the total weight of the mixture (M).

Polymeric Particles

The process of the invention makes possible the preparation of polymeric particles of regular shape and size, for examples PEEK particles, PPSU particles, PSU particles or PES particles.

As used herein, the term "particle" refers to an individualized entity.

The size of the so-obtained particles generally depends from different factors, such as the amount of energy used in the melt-blending step, the nature of the aromatic polymer, for example its viscosity of melt flow rate, the temperature used in the melt-blending step and the ratio polymer:polyester used.

Particles may have an average diameter of less than about 400 μm, in some embodiments from about 0.5 μm to about 350 μm, alternatively from about 1 μm to about 300 μm, or from about 5 μm to about 250 μm. The average diameter can be evaluated by scanning electron microscopy (SEM).

The particles of the present invention can be characterized by their particle size distribution D50 (in short "D50"), which is also known as the median diameter or the medium value of the particle size distribution, according to which 50% of the particles in the sample are larger and 50% of the particles in the sample are smaller. Particle Size Analysis can for example take place in a Microtrac S3500 with Microtrac Sample Delivery Controller (SDC).

According to an embodiment of the present invention, the PEEK particles have a D50 comprised between 5 μm and 100 μm, for example less than 80 μm and greater than 10 μm or less than 60 μm and greater than 15 μm.

According to an embodiment of the present invention, the PPSU particles have a D50 comprised between 5 μm and 500 μm, for example between 8 and 400 μm, greater than 10 μm or less than 300 μm.

According to an embodiment of the present invention, the PSU particles have a D50 comprised between 5 μm and 100 μm, for example less than 80 μm and greater than 10 μm or less than 60 μm and greater than 15 μm.

According to an embodiment of the present invention, the PES particles have a D50 comprised between 5 μm and 200 μm, for example less than 150 μm and greater than 10 μm or less than 120 μm and greater than 30 μm.

The particles of the present invention can be characterized by their bulk density and by their tapped density. The bulk density of a powder is the ratio of the mass of an untapped powder sample and its volume including the contribution of the interparticulate void volume. The bulk density can be expressed in grams per millilitre (g/ml) or in grams per cubic centimetre (g/cm³). Density measurements can for example take place in a Quantachrome Autotap™ Tapped Density analyser.

According to an embodiment of the present invention, the polymer particles have:
a bulk density of at least 0.45, preferably at least 0.47, more preferably at least at least 0.49, and
a tapped density of at least 0.55, preferably at least 0.57, more preferably at least at least 0.59.

The present invention also relates to particles of aromatic polymer produced by a process comprising:
melt-blending the aromatic polymer (P), for example PAEK or PAES, with at least one polyester polymer (PE) comprising units from:
at least one dicarboxylic acid component,
at least one diol component, wherein at least 2 mol. % of the diol component is a poly(alkylene glycol) having a formula (I):

$$H(O-C_mH_{2m})_n-OH$$

wherein m is an integer from 2 to 4 and n varies from 2 to 10, and
dispersing the PE into water.

All of the above-mentioned embodiments regarding the process for preparing particles of aromatic polymer do apply equally to this section.

The particles of the present invention may be substantially spherical, for example with a circularity and/or a roundness of at least 0.75, for example at least 0.8 or at least 0.85.

The roundness is defined as a measure of surface smoothness of the particles and is measured according to the following equation:

$$\text{Roundness} = 4 \times \frac{\text{Area}}{\pi(\text{Major Axis})^2}$$

The circularity is defined as the measure of spherical shape of the particles and is measured according to the following equation:

$$\text{Circularity} = 4\pi \times \frac{\text{Area}}{\text{Perimeter}^2}$$

The particles of polymer obtained from the process above-described can also be submitted to at least one of the following possible steps:

- coating with a powder flow enhancer such as a mineral, for example silica;
- drying to a temperature of at least 80° C., for example at least 90° C., for at least 0.5 hour, preferably at least an hour, at possibly reduced pressure; and
- sieving.

According to an embodiment, the polymer particles of the present invention comprise or consist essentially in:

a polymeric component comprising:
  a) from 55 to 95 wt. %, from 57 to 85 wt. % or from 60 to 80 wt. % of at least one PEEK, and
  b) from 5 to 45 wt. %, from 15 to 43 wt. % or from 20 to 40 wt. % of at least one PPSU,
  based on the total weight of the polymeric component, and from 0 to 30 wt. %, from 0.5 to 28 wt. % or from 1 to 25 wt. % of at least one additive as described above.

According to an embodiment of the present invention, the polymer particles of the present invention comprise or consist essentially in:

a polymeric component comprising:
  a) from 55 to 95 wt. %, from 57 to 85 wt. % or from 60 to 80 wt. % of at least one PEEK, and
  b) from 5 to 45 wt. %, from 15 to 43 wt. % or from 20 to 40 wt. % of at least one PSU,
  based on the total weight of the polymeric component, and from 0 to 30 wt. %, from 0.5 to 28 wt. % or from 1 to 25 wt. % of at least one additive selected from the group consisting of fillers, colorants, lubricants, plasticizers, flame retardants, nucleating agents and stabilizers, based on the total weight of the part material.

Optional Components

The particles of the invention can comprise various additives, such as lubricants, heat stabilizers, light stabilizers, antioxidants, pigments, processing aids, dyes or fillers (e.g. biocompatible fillers such as hydroxyapatite). Mention may in particular be made, by way of examples, of titanium dioxide, zinc oxide, cerium oxide, silica or zinc sulphide, these being used as lubricants and/or abrasive. Fillers (e.g. reinforcing fillers or mineral fillers) can be selected from the group consisting of glass fibers, carbon fibers, talc, wollastonite, calcium carbonate, mica . . . etc.

The polymer composition may further comprise flame retardants such as halogen and halogen free flame retardants.

One of the main advantages of the present invention is that the optional additives, when present, are located inside the polymer particles, and are homogeneously located in the polymer matter.

Applications

The particles of the present invention can be used in various applications, notably SLS 3D printing, coatings and toughening of thermoset resins.

The present invention also therefore relates to the use of the polymeric particles for the manufacture of three-dimensional objects using a laser-sintering additive manufacturing system.

EXAMPLES

Example 1

Raw Materials

PEEK-PEDEK=a copolymer PEEK-PEDEK 70/30 mol/mol prepared according to the following process:

In a 500 mL 4-neck reaction flask fitted with a stirrer, a N2 inlet tube, a Claisen adapter with a thermocouple plunging in the reaction medium, and a Dean-Stark trap with a condenser and a dry ice trap were introduced 129.80 g of diphenyl sulfone, 18.942 g of hydroquinone, 13.686 g of 4,4'biphenol and 54.368 g of 4,4'-difluorobenzophenone. The flask content was evacuated under vacuum and then filled with high purity nitrogen (containing less than 10 ppm O2). The reaction mixture was then placed under a constant nitrogen purge (60 mL/min).

The reaction mixture was heated slowly to 150° C. At 150° C., a mixture of 26.876 g of $Na_2CO_3$ and 0.1524 g of $K_2CO_3$ was added via a powder dispenser to the reaction mixture over 30 minutes. At the end of the addition, the reaction mixture was heated to 320° C. at 1° C./minute. After 10 minutes at 320° C., 6.415 g of 4,4'-difluorobenzophenone were added to the reaction mixture while keeping a nitrogen purge on the reactor. After 5 minutes, 0.418 g of lithium chloride were added to the reaction mixture. 10 minutes later, another 2.138 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 73 g of a white powder.

The melt viscosity measured by capillary rheology at 400° C., 1000 $s^{-1}$ using a tungsten carbide die of 0.5×3.175 mm was 0.19 $kN^{-s}/m^2$.

PE: Sulfopolyester Eastman AQ™ 48 commercially available from Eastman. This PE is composed of diethylene glycol, cyclohexanedimethanol (CHDM), isophthalates and sulfoisophthalates units. According to 1H NMR analysis, the molar concentration of diethylene glycol of 70 mol. %, based on the total moles of diols (CHMD+diethylene glycol).

Material Processing

Blends were made according to Table 1.

Each composition was melt-blended during 3 minutes in a DSM Xplore® Micro-compounder at a specific temperature (see Table 1) and at 150-200 rpm. Each blend was then processed into strands and then quenched in air until solid. Samples were immersed into water heated to 95° C., for 2 hours. Water was then removed. Samples were immersed again into water heated at 90° C., for 2 hours. The powders were then isolated by filtration and vacuum dried.

TABLE 1

|  | PEEK-PEDEK (wt. %) | PE (wt. %) | T (° C.) melt-blend | Form |
|---|---|---|---|---|
| Ex 1 | 40 | 60 | 330 | powder |
| Ex 2 | 30 | 70 | 330 | powder |

Scanning Electron Microscopy (SEM)

Scanning electron microscopy was used to examine each polymer sample as indicated below. Powders were dispersed onto carbon-tape affixed to aluminum stub, and then sputter-coated with AuPd using an Emitech K575x Turbo Sputter Coater. Images were recorded using a Hitachi S-4300 Cold Field Emission Scanning Electron Microscope and images were analysed for average diameter using ImageJ v 1.49b Java-Based Image Analysis Software on approximated 50 particle images. A summary of average particle diameter estimated from SEM pictures for the powders appear in Table 2.

FIG. 1 is an SEM scan of the PEEK-PEDEK 70/30 mol/mol copolymer particles of Example 1.

Figure 2:
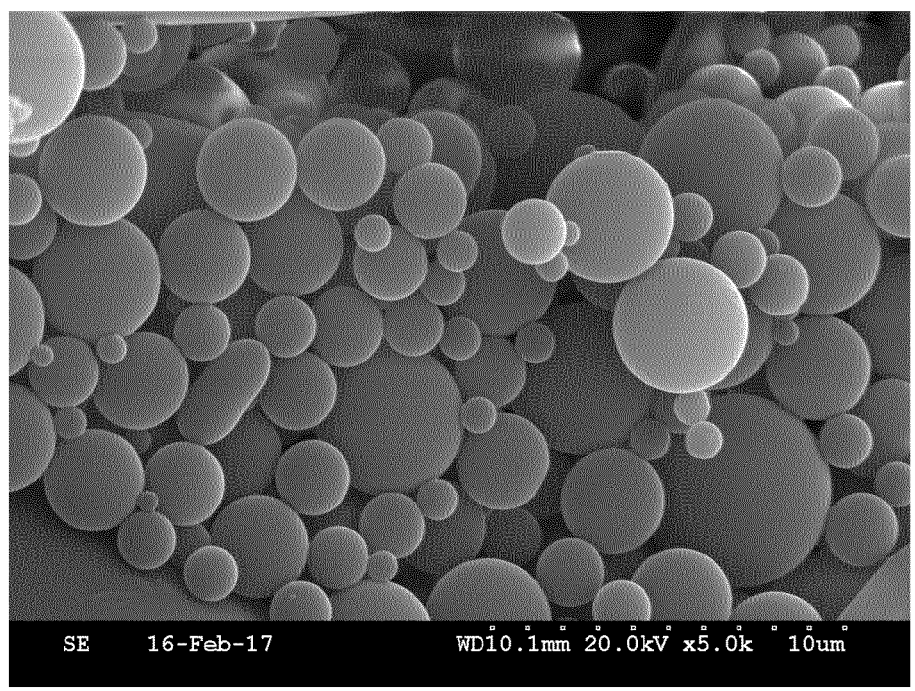
FIG. 2 is a scanning electron microscopy (SEM) image of the PPSU particles of Example 2.

FIG. 2 is an SEM scan of the PEEK-PEDEK 70/30 mol/mol copolymer particles of Example 2.

Particle Size Analysis—D50

Particle size analysis (PSA) was conducted using a Microtrac S3500 with Microtrac Sample Delivery Controller (SDC).

TABLE 2

|      | Average diameter (μm) | D50 (μm) |
|------|-----------------------|----------|
| Ex 1 | 13.3                  | 23.6     |
| Ex 2*| 8.4                   | 18.1     |

*The particles of example 2, shown on FIG. 2, have a circularity of 0.915 ± 0.016 and a roundness of 0.970 ± 0.017.

Example 2

Raw Materials

PPSU: Radel® PPSU R5600, commercially available from Solvay Specialty Polymers LLC PSU: Udel® PSU 3500 NT, commercially available from Solvay Specialty Polymers LLC PES: Veradel® PES 3600P, commercially available from Solvay Specialty Polymers LLC PE: Sulfopolyester Eastman AQ™ 48 commercially available from Eastman Material Processing Blends were made according to Table 3.

Each composition was melt-blended during 3 minutes DSM Xplore® Micro-compounder at a specific temperature (see Table 3). Each blend was then processed into strands and then quenched in air until solid. Samples were immersed into water heated to 95° C., for 2 hours. Water was then removed. Samples were immersed again into water heated at 90° C., for 2 hours.

All the compositions gave a polymer powder according to the invention. The powders were then isolated by filtration and vacuum dried.

TABLE 3

|      | PSU (wt. %) | PES (wt. %) | PPSU (wt. %) | PE (wt. %) | T (° C.) melt-blend | Form   |
|------|-------------|-------------|--------------|------------|---------------------|--------|
| Ex 3 | 30          | —           | —            | 70         | 360                 | powder |
| Ex 4 | —           | 30          | —            | 70         | 360                 | powder |
| Ex 5 | —           | —           | 50           | 50         | 360                 | powder |
| Ex 6 | —           | —           | 40           | 60         | 360                 | powder |

SEM and PSA were conducted on the powders as detailed in Example 1.

TABLE 4

|      | Average diameter (μm) | D50 (μm) |
|------|-----------------------|----------|
| Ex 3 | 19.4                  | 26.1     |
| Ex 4 | 73.6                  | 87.7     |
| Ex 5 | 9.1                   | 258.3    |
| Ex 6 | 7.6                   | 277.9    |

FIG. 2 is an SEM scan of the PPSU particles of Example 2.

Example 3

Raw Materials

PEKK (T/I ratio of 60/40) prepared according to the below process:

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 127.50 g of diphenyl sulfone, 33.390 g of 1,3-bis(4'-hydroxybenzoyl)benzene, 6.360 g of 1,4-bis(4'-hydroxybenzoyl)benzene and 40.810 g of 1,4-bis(4'-fluorobenzoyl)benzene. The flask content was evacuated under vacuum and then filled with high purity nitrogen (containing less than 10 ppm $O_2$). The reaction mixture was then placed under a constant nitrogen purge (60 mL/min). The reaction mixture was heated slowly to 280° C. At 280° C., 13.743 g of $Na_2CO_3$ and 0.086 g of $K2CO^3$ were added via a powder dispenser to the reaction mixture over 60 minutes. At the end of the addition, the reaction mixture was heated to 320° C. at 1° C./minute. After 100 minutes at 320° C., 1.207 g of 1,4-bis(4'-fluorobenzoyl)benzene were added to the reaction mixture while keeping a nitrogen purge on the reactor. After 5 minutes, 0.530 g of lithium chloride were added to the reaction mixture. 10 minutes later, another 0.503 g of 1,4-bis(4'-fluorobenzoyl)benzene were added to the reactor and the reaction mixture was kept at temperature for 15 minutes. The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 72 g of an off-white/yellow powder. The final polymer had a T/I ratio of 60/40.

PE: Sulfopolyester Eastman AQ™ 38 S commercially available from Eastman. This PE is composed of diethylene glycol, cyclohexanedimethanol (CHDM), isophthalates and sulfoisophthalates units. According to 1H NMR analysis, the molar concentration of diethylene glycol of 80 mol. %, based on the total moles of diols (CHMD+diethylene glycol).

Material Processing

Blends were made according to Table 5.

Each composition was melt-blended in a ZSK-26 Twin Screw Extruder (Coperion) at specific conditions indicated in Table 5.

Each polymer melt was dropped from the extruder die in a bucket of hot water (60° C.) with occasional mixing. Powders were isolated by vacuum filtration employing a Buchner funnel. Powders were then washed with 2-3 L of deionized water in the Buchner funnel. Solids were then transferred into a beaker and washed in 0.5-1 L of 20% phosphoric acid at 80° C. for 1-2 hours. Powders were dried at 100° C. and reduced pressure. Each polymer was mixed with colloidal silica (Aerosil® 200, Spectrum Chemical) to give a 1 wt. % mixture.

TABLE 5

| | PEKK (wt. %) | PE (wt. %) | Screw speed (rpm) | Melt Temp (° C.) | Throught-put (lb/hr) |
|---|---|---|---|---|---|
| Ex 7 | 30 | 70 | 100 | 345 | 15 |
| Ex 8 | 35 | 65 | 100 | 340 | 15 |

Particle Size Analysis—D50

Particle size analysis (PSA) was conducted using a Microtrac S3500 with Microtrac Sample Delivery Controller (SDC).

Bulk and Tapped Densities

Density was conducted using a Quantachrome Autotap™ Tapped Density analyser, employing a cycle of 500 taps.

TABLE 6

| | $D_{10}$ (μm) | $D_{50}$ (μm) | $D_{90}$ (μm) | Bulk density | Tapped density |
|---|---|---|---|---|---|
| Ex 7 | 22 | 43 | 105 | 0.721 | 0.825 |
| Ex 8 | 27 | 49 | 105 | 0.725 | 0.837 |

Example 4

Raw Materials

PEEK—Melt mass-flow rate (MFR) (400° C./2.16 kg), 36 g/10 in.

(ASTM D1238) prepared according to the below process:

In a 500 ml 4-neck reaction flask fitted with a stirrer, a N2 inlet tube, a Claisen adapter with a thermocouple plunging in the reaction medium, and a Dean-Stark trap with a condenser and a dry ice trap were introduced 128 g of diphenyl sulfone, 28.6 g of p-hydroquinone, and 57.2 g of 4,4'-difluorobenzophenone. The reaction mixture was heated slowly to 150° C. At 150° C., a mixture of 28.43 g of dry $Na_2CO_3$ and 0.18 g of dry $K_2CO_3$ was added via a powder dispenser to the reaction mixture over 30 minutes. At the end of the addition, the reaction mixture was heated to 320° C. at 1° C./minute.

After 15 to 30 minutes, when the polymer had the expected Mw, the reaction was stopped by the introduction of 6.82 g of 4,4'-difluorobenzophenone to the reaction mixture while keeping a nitrogen purge on the reactor. After 5 minutes, 0.44 g of lithium chloride were added to the reaction mixture. 10 minutes later, another 2.27 g of 4,4'-difluorobenzophenone were added to the reactor and the reaction mixture was kept at temperature for 15 minutes. The reactor content was then cooled. The solid was broken up and ground. The polymer was recovered by filtration of the salts, washing and drying.

PE: Sulfopolyester Eastman AQ™ 38 S commercially available from Eastman. This PE is composed of diethylene glycol, cyclohexanedimethanol (CHDM), isophthalates and sulfoisophthalates units. According to 1H NMR analysis, the molar concentration of diethylene glycol of 80 mol. %, based on the total moles of diols (CHMD+diethylene glycol).

Material Processing

Blends were made according to the processing described in example 3.

TABLE 6

| | PEEK (wt. %) | PE (wt. %) | Screw speed (rpm) | Melt Temp (° C.) | Throught-put (lb/hr) |
|---|---|---|---|---|---|
| Ex 9 | 30 | 70 | 200 | 330 | 15 |
| Ex 10 | 30 | 70 | 400 | 330 | 15 |

Particles Characterization:

TABLE 7

| | $D_{10}$ (μm) | $D_{50}$ (μm) | $D_{90}$ (μm) | Bulk density | Tapped density |
|---|---|---|---|---|---|
| Ex 9 | 19 | 35 | 116 | 0.773 | 0.858 |
| Ex 10 | 16 | 29 | 79 | 0.721 | 0.842 |

Example 5

Raw Materials

PE: Sulfopolyester Eastman AQ™ 48 Ultra commercially available from Eastman. This PE is composed of diethylene glycol, cyclohexanedimethanol (CHDM), isophthalates and sulfoisophthalates units. According to 1H NMR analysis, the molar concentration of diethylene glycol of 80 mol. %, based on the total moles of diols (CHMD+diethylene glycol).

PPSU (Mw: 46,500 g/mol), prepared according to the below process:

The synthesis of the PPSU was achieved by the reaction in a 1 L flask of 83.8 g of 4,4'-biphenol (0.450 mol), 131.17 g of 4,4'-dichlorodiphenyl sulfone (0.457 mol) dissolved in a mixture of 400 g of sulfolane with the addition of 66.5 g (0.481 mol) of dry K2003. The reaction mixture was heated up to 210° C. and maintained at this temperature until the polymer had the expected Mw. An excess of methyl chloride was then added to the reaction. The reaction mixture was diluted with 600 g of MCB. The poly(biphenyl ether sulfone) was recovered by filtration of the salts, coagulation, washing and drying. The GPC analysis showed a number average molecular weight (Mw) of 46,500 g/mol, a Mn of 19,200 g/mol and a PDI index of 2.48.

Molecular Weight of the PPSU:

The molecular weight was measured by gel permeation chromatography (GPC), using methylene chloride as a mobile phase. Two 5p mixed D columns with guard column from Agilent Technologies were used for separation. An ultraviolet detector of 254 nm was used to obtain the chromatogram. A flow rate of 1.5 ml/min and injection volume of 20 μL of a 0.2 w/v % solution in mobile phase was selected. Calibration was performed with 12 narrow molecular weight polystyrene standards (Peak molecular weight range: 371,000 to 580 g/mol).

Material Processing

Blends were made according to the processing described in example 3.

TABLE 6

|  | PPSU (wt. %) | PE (wt. %) | Screw speed (rpm) | Melt Temp (° C.) | Throught-put (lb/hr) |
|---|---|---|---|---|---|
| Ex 11 | 20 | 80 | 200 | 350 | 15 |
| Ex 12 | 30 | 70 | 300 | 340 | 15 |

Particles Characterization:

TABLE 7

|  | $D_{10}$ (μm) | $D_{50}$ (μm) | $D_{90}$ (μm) | Bulk density | Tapped density |
|---|---|---|---|---|---|
| Ex 11 | 8 | 12 | 18 | 0.593 | 0.818 |
| Ex 12 | 6 | 10 | 27 | 0.617 | 0.784 |

Example 7

Raw Materials

PE: Sulfopolyester Eastman AQ™ 48 Ultra commercially available from Eastman. This PE is composed of diethylene glycol, cyclohexanedimethanol (CHDM), isophthalates and sulfoisophthalates units. According to 1H NMR analysis, the molar concentration of diethylene glycol of 80 mol. %, based on the total moles of diols (CHMD+diethylene glycol).

PEEK, prepared according to the process of Example 5

PPSU, prepared according to the process of example 6, except that the reaction was stopped later to lead to a PPSU with a Mw of 55,000 g/mol, a Mn of 22,000 g/mol and PDI index is 2.5 9measured according to the method given in Example 6)

The blend of PEEK and PPSU was obtained by melt compounding using a 26 mm diameter Coperion® ZSK-26 co-rotating partially intermeshing twin screw extruder having an L/D ratio of 48:1. The barrel sections 2 through 12 and the die were heated to set point temperatures as follows:

Barrels 2-6: 350° C.

Barrels 7-12: 360° C.

Die: 360° C.

The blend was fed at barrel section 1 using a gravimetric feeder at throughput rates in the range 30-35 lb/hr. The extruder was operated at screw speeds of around 200 RPM. Vacuum was applied at barrel zone 10 with a vacuum level of about 27 inches of mercury. A single-hole die was used for all the compounds to give a filament approximately 2.6 to 2.7 mm in diameter and the polymer filament exiting the die was cooled in water and fed to the pelletizer to generate pellets approximately 2.7 mm in length. Pellets were dried at 140° C. for 16 h under vacuum.

Material Processing

Blends were made according to the processing described in example 3.

TABLE 8

|  | PEEK-PPSU (wt. %) | PE (wt. %) | Screw speed (rpm) | Melt Temp (° C.) | Throught-put (lb/hr) |
|---|---|---|---|---|---|
| Ex 13 | 20 | 80 | 100 | 350 | 15 |
| Ex 14 | 20 | 80 | 300 | 350 | 15 |

Particles Characterization:

TABLE 9

|  | $D_{10}$ (μm) | $D_{50}$ (μm) | $D_{90}$ (μm) | Bulk density | Tapped density |
|---|---|---|---|---|---|
| Ex 13 | 7 | 43 | 256 | 0.696 | 0.957 |
| Ex 14 | 7 | 19 | 64 | 0.638 | 0.854 |

The invention claimed is:

1. A process for preparing polymeric particles, comprising the following steps:
   melt-blending a mixture (M) comprising:
   a) at least one polymer (P) selected from the group consisting of poly(aryl ether ketone) (PAEK), poly(aryl ether sulfone) (PAES), polyetherimide (PEI), poly(phenyl ether) (PPE), aromatic polyamideimide (PAI) and polyphenylene (PPh), and
   b) at least one polyester polymer (PE) comprising units from:
      at least one dicarboxylic acid component,
      at least one diol component, wherein at least 2 mol. % of the diol component is a poly(alkylene glycol) having a formula (I):

$$H(O-C_mH_{2m})_n-OH$$

wherein m is an integer from 2 to 4 and n varies from 2 to 10,
   processing the mixture (M) into pellets or strands,
   cooling the pellets or strands at a temperature below 80° C.,
   contacting said pellets or strands with water, optionally heated to a temperature up to 95° C., optionally supplemented with an acid or a base,
   recovering the particles,
   optionally drying the particles, and
   optionally sieving the particles.

2. The process of claim 1, wherein the mixture (M) comprises at least a poly(ether ether ketone) (PEEK) with at least 50 mol. % of recurring units of formula (J-A), the mol. % being based on the total number of moles in the polymer:

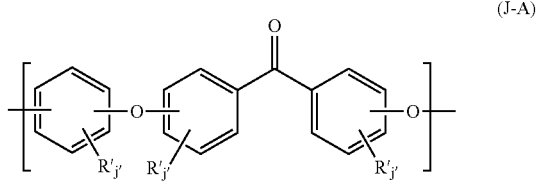
(J-A)

where
   each R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
   each j', equal to or different from each other, is zero or an integer ranging from 1 to 4.

3. The process of claim 1, wherein the mixture (M) comprises at least a poly(aryl ether sulfone) (PAES) with at least 50 mol. % of recurring units of formula (K), the mol. % being based on the total number of moles in the polymer:

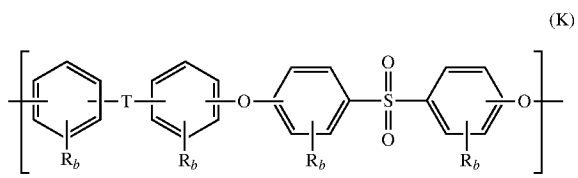

(K)

where
- each R, equal to or different from each other, is selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;
- each h, equal to or different from each other, is an integer ranging from 0 to 4; and
- T is selected from the group consisting of a bond, a sulfone group [—S(=O)$_2$—], and a group —C(R$_j$)(R$_k$)—, where R$_j$ and R$_k$, equal to or different from each other, are selected from a hydrogen, a halogen, an alkyl, an alkenyl, an alkynyl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium.

4. The process of claim 1, wherein the PE further comprises recurring units from a difunctional monomer containing at least one SO$_3$M group attached to an aromatic nucleus, wherein the functional groups are carboxy, and wherein M is H or a metal ion selected from the group consisting of sodium, lithium and potassium.

5. The process of claim 1, wherein the PE comprises units from:
- at least one aromatic dicarboxylic acid component,
- at least one diol component,
- at least 1 mol. % (based on the total number of moles in the PE) of poly(alkylene glycol) of formula (I):

$$H(O\text{—}C_mH_{2m})_n\text{—}OH$$

wherein m is an integer from 2 to 4 and n varies from 2 to 10,
- at least one aromatic dicarboxylic acid containing at least one SO$_3$M group attached to an aromatic nucleus, wherein M is H or a metal ion selected from the group consisting of sodium, lithium and potassium.

6. The process of claim 1, wherein the PE comprises or consists essentially in units from:
- isophthalic acid,
- a diol selected from the group consisting of ethylene glycol, 1,4-cyclohexanedimethanol, propane-1,2-diol, 2,2-dimethyl-1,3-propanediol and mixture thereof,
- at least 2 mol. % (based on the total number of moles in the PE) of poly(alkylene glycol) of diethylene glycol,
- an aromatic dicarboxylic acid containing at least one SO$_3$M group attached to an aromatic nucleus, wherein M is H or a metal ion selected from the group consisting of sodium, lithium and potassium.

7. The process of claim 1, wherein the mixture (M) comprises:
a) from 10 to 60 wt. % of at least one polymer (P), and
b) from 40 to 90 wt. % of polyester (PE).

8. The process of claim 1, wherein the step of melt-blending takes place at a temperature above 250° C.

9. Particles of polymer (P) obtained by the process of claim 1.

10. Particles of polymer (P) selected from the group consisting of poly(aryl ether ketone) (PAEK), poly(aryl ether sulfone) (PAES), polyetherimide (PEI), poly(phenyl ether) (PPE), aromatic polyamideimide (PAI), polyphenylene (PP) and blends thereof, the particles being produced by a process comprising:
- melt-blending the polymer (P) with at least one polyester polymer (PE) comprising units from:
  - at least one dicarboxylic acid component,
  - at least one diol component, wherein at least 2 mol. % of the diol component is a poly(alkylene glycol) having a formula (I):

$$H(O\text{—}C_mH_{2m})_n OH$$

wherein m is an integer from 2 to 4 and n varies from 2 to 10, and
- dispersing the PE into water.

11. The particles of claim 9, wherein the particles have a D50 comprised between 5 μm and 100 μm.

12. The particles of claim 9, wherein the particles have:
- a bulk density of at least 0.45, and
- a tapped density of at least 0.55.

13. A method for the manufacture of three-dimensional objects, comprising using the particles of claim 9 in a laser-sintering based additive manufacturing system.

14. A method for the toughening of thermoset resins, comprising using the particles of claim 9.

15. The particles of claim 10, wherein the particles have:
- a bulk density of at least 0.45, and
- a tapped density of at least 0.55.

16. A method for the manufacture of three-dimensional objects, comprising using the particles of claim 10 in a laser-sintering based additive manufacturing system.

17. The particles of claim 10, wherein the particles have a D50 comprised between 5 μm and 100 μm.

18. The particles of claim 12, wherein the particles are substantially spherical with a roundness of at least 0.75, the roundness being measured according to the following equation:

$$\text{Roundness} = 4 * \frac{\text{Area}}{\pi(\text{Major Axis})^2}.$$

19. The particles of claim 12, wherein the particles are substantially spherical with a circularity of at least 0.75, the circularity being measured according to the following equation:

$$\text{Circularity} = 4\pi * \frac{\text{Area}}{(\text{Perimeter})^2}.$$

20. The particles of claim 15, wherein the particles are substantially spherical with a roundness of at least 0.75, the roundness being measured according to the following equation:

$$\text{Roundness} = 4 * \frac{\text{Area}}{\pi(\text{Major Axis})^2}.$$

21. The particles of claim 15, wherein the particles are substantially spherical with a circularity of at least 0.75, the circularity being measured according to the following equation:

$$\text{Circularity} = 4\pi * \frac{\text{Area}}{(\text{Perimeter})^2}.$$

* * * * *